United States Patent
Lee et al.

(10) Patent No.: US 11,101,902 B2
(45) Date of Patent: Aug. 24, 2021

(54) METHOD FOR MEASURING SIGNAL RECEPTION POWER OF TERMINAL IN WIRELESS COMMUNICATION SYSTEM AND TERMINAL USING METHOD

(71) Applicant: LG ELECTRONICS INC., Seoul (KR)

(72) Inventors: Seungmin Lee, Seoul (KR); Hanbyul Seo, Seoul (KR); Hyukjin Chae, Seoul (KR)

(73) Assignee: LG Electronics Inc., Seoul (KR)

(*) Notice: Subject to any disclaimer, the term of this patent is extended or adjusted under 35 U.S.C. 154(b) by 171 days.

(21) Appl. No.: 16/487,454

(22) PCT Filed: Mar. 5, 2018

(86) PCT No.: PCT/KR2018/002594
§ 371 (c)(1),
(2) Date: Aug. 21, 2019

(87) PCT Pub. No.: WO2018/160048
PCT Pub. Date: Sep. 7, 2018

(65) Prior Publication Data
US 2020/0067610 A1    Feb. 27, 2020

Related U.S. Application Data

(60) Provisional application No. 62/466,395, filed on Mar. 3, 2017, provisional application No. 62/474,089, filed on Mar. 21, 2017.

(51) Int. Cl.
*H04B 17/327* (2015.01)
*H04B 17/20* (2015.01)
(Continued)

(52) U.S. Cl.
CPC ........... *H04B 17/327* (2015.01); *H04B 17/20* (2015.01); *H04L 5/0048* (2013.01); *H04W 4/40* (2018.02);
(Continued)

(58) Field of Classification Search
CPC ....... H04W 92/18; H04W 4/40; H04W 76/14; H04W 4/46; H04W 8/005; H04W 72/042;
(Continued)

(56) References Cited

U.S. PATENT DOCUMENTS

2013/0329651 A1    12/2013   Lee et al.
2016/0142898 A1     5/2016   Poitau et al.
(Continued)

FOREIGN PATENT DOCUMENTS

CN     106341794 A    1/2017
CN     106454752 A    2/2017
(Continued)

OTHER PUBLICATIONS

Intel Corporation, "Transmit Diversity for NR Physical Downlink Control Channel," R1-1702218, 3GPP TSG-RAN WG1 #88, Athena, Greece, Feb. 7, 2017, see section 2.
(Continued)

*Primary Examiner* — Shukri Taha
(74) *Attorney, Agent, or Firm* — Dentons US LLP

(57) ABSTRACT

The present invention relates to a method for measuring signal reception power of a vehicle to everything (V2X) terminal in a wireless communication system and provides a method which receives information on at least one of whether a transmission diversity mode coexists on V2X resource pool set by the terminal, the number of antenna ports used by the transmission diversity mode of another terminal for which the terminal intends to measure the signal reception power, and the transmission diversity technique
(Continued)

type of the other terminal, and detects a specific terminal performing a transmission diversity-based V2X transmission operation based on the information, and measures the physical sidelink shared channel reference signal received power (PSSCH RSRP) for the specific terminal.

13 Claims, 11 Drawing Sheets

(51) Int. Cl.
　　　*H04W 76/14* (2018.01)
　　　*H04W 4/40* (2018.01)
　　　*H04L 5/00* (2006.01)
　　　*H04W 8/00* (2009.01)
　　　*H04W 72/04* (2009.01)

(52) U.S. Cl.
　　　CPC ......... *H04W 8/005* (2013.01); *H04W 72/042* (2013.01); *H04W 72/048* (2013.01); *H04W 76/14* (2018.02)

(58) Field of Classification Search
　　　CPC .. H04W 72/048; H04W 72/02; H04B 17/327; H04B 17/20; H04L 5/0048
　　　See application file for complete search history.

(56) References Cited

U.S. PATENT DOCUMENTS

| 2016/0159715 | A1  | 6/2016 | Davis et al. |
| 2018/0115970 | A1* | 4/2018 | Chae .................... G08G 1/012 |
| 2019/0208441 | A1* | 7/2019 | Wang ................. H04B 17/318 |

FOREIGN PATENT DOCUMENTS

| CN | 106686724 A | 5/2017 |
| KR | 1020160121441 | 10/2016 |
| WO | 2016159559 | 10/2016 |
| WO | 2016159715 | 10/2016 |

OTHER PUBLICATIONS

Intel Corporation, "Discussion on V2V RRM Impacts", 3GPP TSG-RAN WG4 Meeting #80, Aug. 22-26, 2016, R4-165024.
Intel Corporation, "V2X RRM requirements for UE autonomous resource selection", 3GPP TSG-RAN WG4 Meeting #80bis, Oct. 10-14, 2016, R4-167999.
Fujitsu, "Discussion on Possible schemes in high Doppler case", 3GPP TSG RAN WG1 Meeting #82bis, Oct. 5-9, 2015, R1-155160.
Samsung, "Discussion on congestion control", 3GPP TSG RAN WG1 #87, Nov. 14-18, 2016, R1-1612392.

* cited by examiner

METHOD FOR MEASURING SIGNAL RECEPTION POWER OF TERMINAL IN WIRELESS COMMUNICATION SYSTEM AND TERMINAL USING METHOD

CROSS-REFERENCE TO RELATED APPLICATIONS

This application is the National Stage filing under 35 U.S.C. 371 of International Application No. PCT/KR2018/002594, filed on Mar. 5, 2018, which claims the benefit of U.S. Provisional Applications Nos. 62/466,395 filed on Mar. 3, 2017 and 62/474,089 filed on Mar. 21, 2017, the contents of which are all hereby incorporated by reference herein in their entirety.

BACKGROUND OF THE INVENTION

Field of the invention

The present invention relates to wireless communication, and more particularly, to a method for measuring signal receiving power of a terminal in a wireless communication system and a terminal using the method.

Related Art

The International Telecommunication Union Radio communication sector (ITU-R) is working on the standardization of International Mobile Telecommunication (IMT)-Advanced, the next generation of mobile communication systems after the third generation. IMT-Advanced aims to support Internet Protocol (IP)-based multimedia services at data rates of 1 Gbps in stationary and slow motions and 100 Mbps in high speeds.

3rd Generation Partnership Project (3GPP) is preparing LTE-Advanced (LTE-A), which is an improvement of Long Term Evolution (LTE) based on Orthogonal Frequency Division Multiple Access (OFDMA)/Single Carrier-Frequency Division Multiple Access (SC-FDMA) transmission scheme, as a system standard that meets the requirements of IMT-Advanced. LTE-A is one of the potential candidates for IMT-Advanced.

Recently, interest in Device-to-Device (D2D) technology for direct communication between devices is increasing. In particular, D2D is drawing attention as a communication technology for a public safety network. Commercial communication networks are rapidly changing to LTE, but current public safety networks are mainly based on 2G technology in terms of cost and conflict with existing communication standards. This gap in technology and the need for improved services have led to efforts to improve public safety networks.

The above-described D2D communication can be extended and applied to signal transmission and reception between vehicles, and communication related to a vehicle is specifically called V2X (vehicle-to-everything) communication. In V2X, the term "X" may mean PEDESTRIAN (communication between a vehicle and a device carried by an individual (e.g., handheld terminal carried by a pedestrian, cyclist, driver or passenger), and at this time, V2X may also be called V2P), VEHICLE (communication between vehicles) (V2V), INFRASTRUCTURE/NETWORK (communication between a vehicle and a roadside unit (RSU)/network; e.g., RSU is a transportation infrastructure entity; e.g., An entity transmitting speed notifications) implemented in an eNB or a stationary UE)) (V2I/N), etc. A device (related with V2P communication) possessed by a pedestrian (or person) is named "P-UE", and a device installed in a vehicle is named "V-UE". In the present invention, the term "entity" may be interpreted as at least one of P-UE, V-UE, and RSU (/NETWORK/INFRASTRUCTURE).

Meanwhile, whether or not to introduce transmission diversity in V2X communication is being discussed. For example, whether or not transmission diversity is allowed in the resource pool for a specific V2X resource pool may be determined by the network, and if transmission diversity is allowed, each terminal may determine whether V2X communication based on transmission diversity is to be performed.

Accordingly, in the case where V2X communication between a terminal to perform V2X communication based on transmission diversity and a terminal (e.g., a legacy terminal) not to perform such a communication is performed, additional information or operations such as sensing of the terminal, measurement of PSSCH Reference Signal Received Power (PSSCH-RSRP), and power boosting may be required to prevent resource collision between the terminals.

Accordingly, the present invention provides a method of measuring signal receiving power of a terminal and a terminal using the method according to the introduction of transmission diversity in V2X communication.

SUMMARY OF THE INVENTION

An object of the present invention is to provide a method for measuring signal reception power of a terminal in a wireless communication system and a terminal using the method.

In one aspect, provided is a method for measuring signal reception power of a terminal in a wireless communication system. The method comprises receiving information on at least one of whether a transmission diversity mode coexists on a vehicle to everything (V2X) resource pool which is set by the terminal, the number of antenna ports used by the transmission diversity mode of another terminal for which the terminal intends to measure the signal reception power, and a transmission diversity scheme type of the another terminal, detecting a specific terminal performing a transmission diversity-based V2X transmission operation based on the information, and measuring a physical sidelink shared channel reference signal received power (PSSCH RSRP) for the specific terminal.

Herein, the information may be included in a V2X resource pool setting information or a field defined in a physical sidelink control channel (PSCCH).

Herein, the information may be received by using reserved bits on a PSCCH.

Herein, the terminal and the specific terminal may exist in the same V2X resource pool.

Herein, the terminal may increase a PSSCH RSRP value measured on an antenna port used for V2X transmission of the terminal by a preset offset.

Herein, the terminal may measure a PSSCH RSRP on a plurality of antenna ports used by the specific terminal, respectively, and a final PSSCH RSRP is determined by combining the measured values.

Herein, the specific terminal may have a prose per packet priority (PPPP) within a preset range.

Herein, the specific terminal may have a channel busy ratio (CBR) smaller than a preset threshold.

Herein, the V2X resource pool may be independently set from a V2X resource pool which does not allow V2X communication based on transmission diversity.

Herein, in the V2X resource pool, transmission diversity is applicable only to PSSCH transmission.

Herein, the specific terminal may be a terminal within a preset speed range.

Herein, the terminal may measure a PSSCH-RSRP based on a demodulation reference signal (DMRS) generated by the specific terminal, and a demodulation reference signal (DMRS) sequence generated by the specific terminal may be generated in a same manner as that of generating a DRMS sequence by the terminal.

In another aspect, provided is a terminal comprising a transceiver configured to transmit and receive a wireless signal, and a processor configured to be operated in combination with the transceiver, wherein the processor is configured to receive information on at least one of whether a transmission diversity mode coexists on a vehicle to everything (V2X) resource pool which is set by the terminal, the number of antenna ports used by the transmission diversity mode of another terminal for which the terminal intends to measure the signal reception power, and a transmission diversity scheme type of the another terminal, detect a specific terminal performing a transmission diversity-based V2X transmission operation based on the information, and measure a physical sidelink shared channel reference signal received power (PSSCH RSRP) for the specific terminal.

According to the present invention, when a terminal using transmission diversity and a terminal not using transmission diversity coexist, resource collision can be prevented by measuring signal reception power considering a transmission diversity scheme.

DESCRIPTION OF EXEMPLARY EMBODIMENTS

Figure 1:
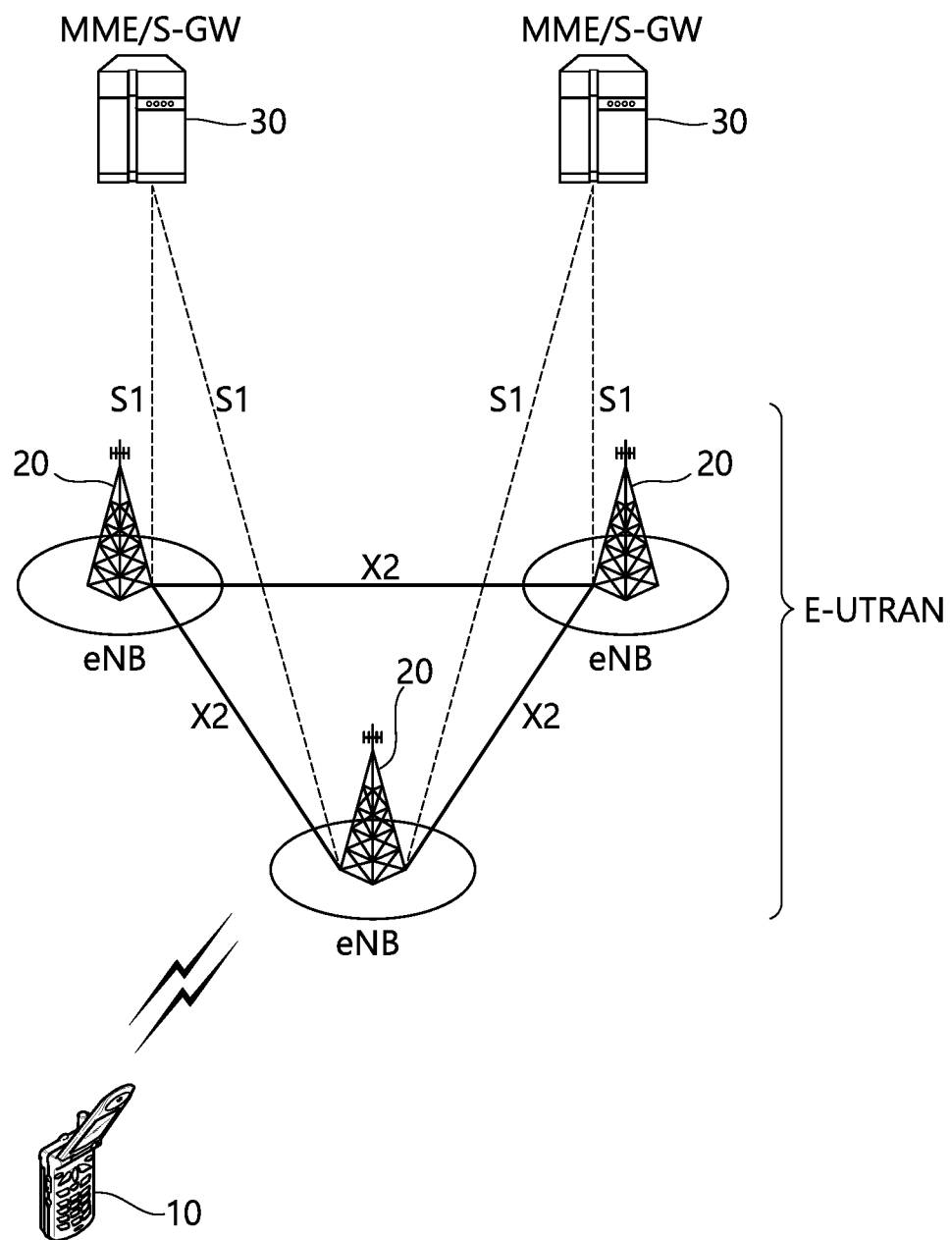
FIG. 1 shows a wireless communication system.

FIG. 1 shows a wireless communication system. The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
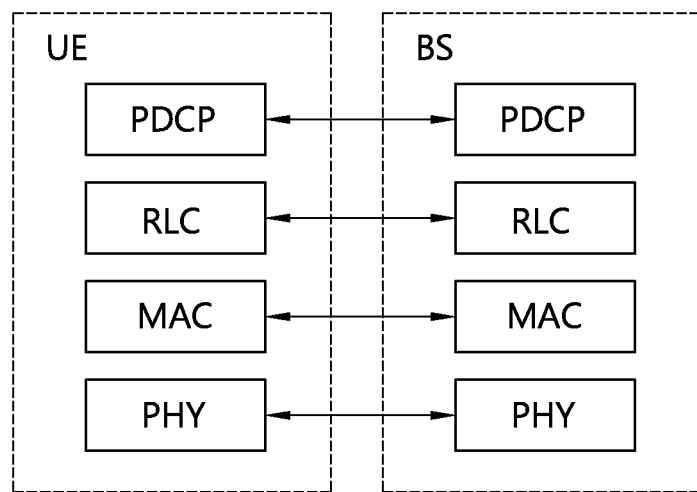
FIG. 2 is a diagram showing a wireless protocol architecture for a user plane.
Figure 3:
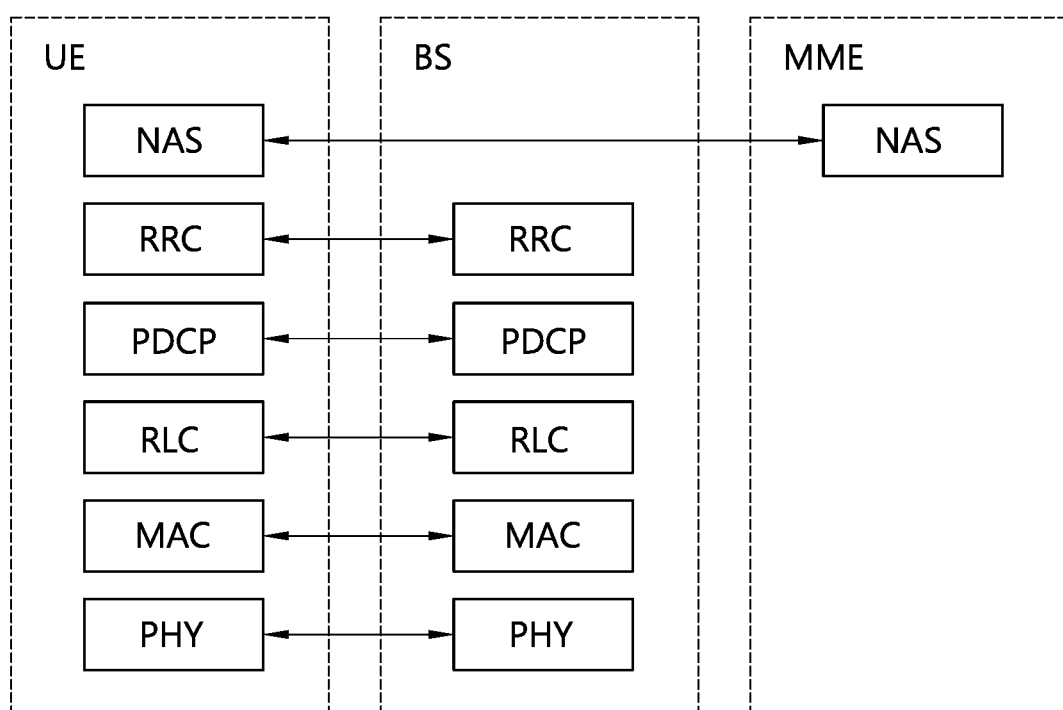
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

In what follows, a new radio access technology (RAT) will be described. The new radio access technology may also be called a new radio for short.

As more and more communication devices require a larger communication capacity, needs for improved mobile broadband communication over conventional radio access technologies (RATs) are emerging. Also, massive Machine Type Communication (MTC) which connects a plurality of devices and objects to each other and provides various services anytime and anywhere is also one of important issues that need to be considered in the next-generation communication. In addition, a new communication system design is under consideration, which takes into account services or terminals sensitive to reliability and latency; adoption of the next-generation radio access technology which supports enhanced mobile broadband communication, massive MTC, Ultra-Reliable and Low Latency Communication (URLLC), and so on is under consideration, which, for the purpose of convenience, is referred to as a new RAT or new radio (NR) in the present invention.

Figure 4:
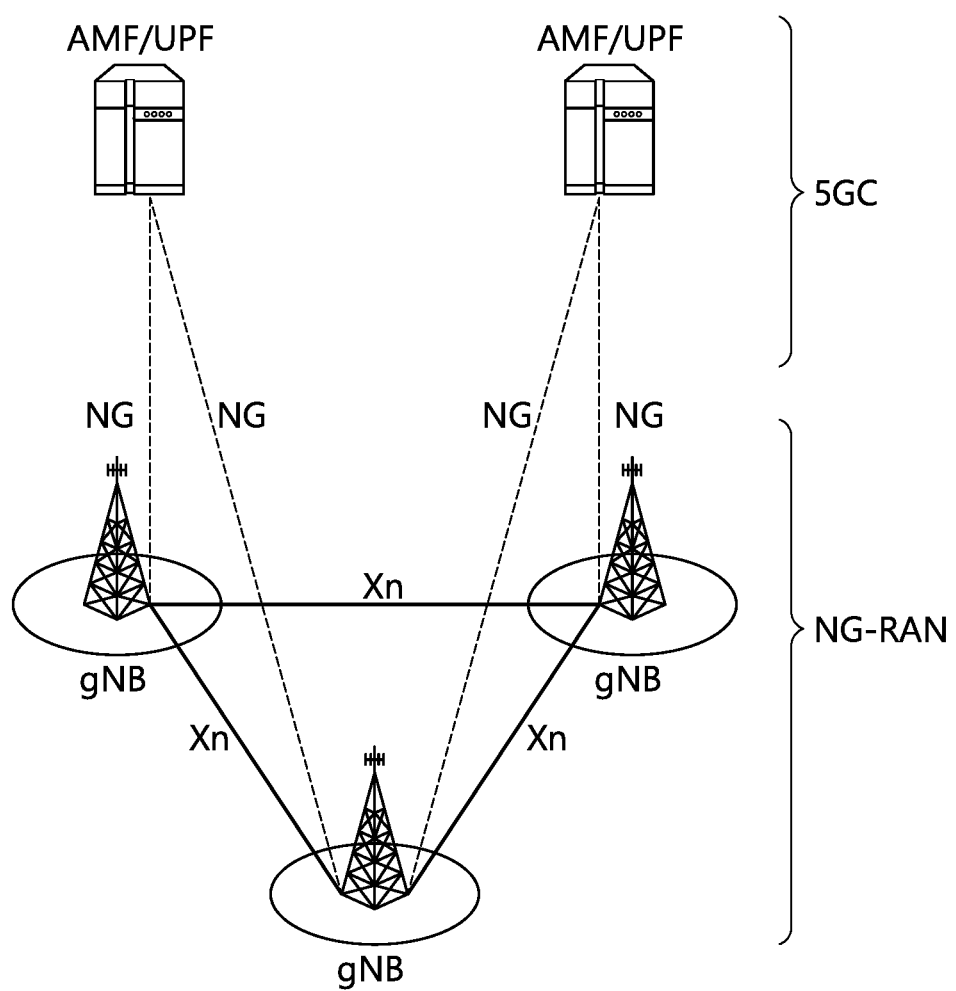
FIG. 4 illustrates a system structure of a new generation radio access network (NG-RAN) to which NR is applied.

FIG. 4 illustrates a system structure of a new generation radio access network (NG-RAN) to which NR is applied.

Referring to FIG. 4, NG-RAN may include a gNB and/or eNB which provides a UE with the user plane and control plane protocol termination. FIG. 4 illustrates the case where only the gNB is included. The gNB and the eNB are connected to each other through the Xn interface. The gNB and the eNB are connected to the 5G core network (5GC) through the NG interface. More specifically, the gNB and the eNB are connected to the access and mobility management function (AMF) through the NG-C interface and to the user plane function (UPF) through the NG-U interface.

Figure 5:
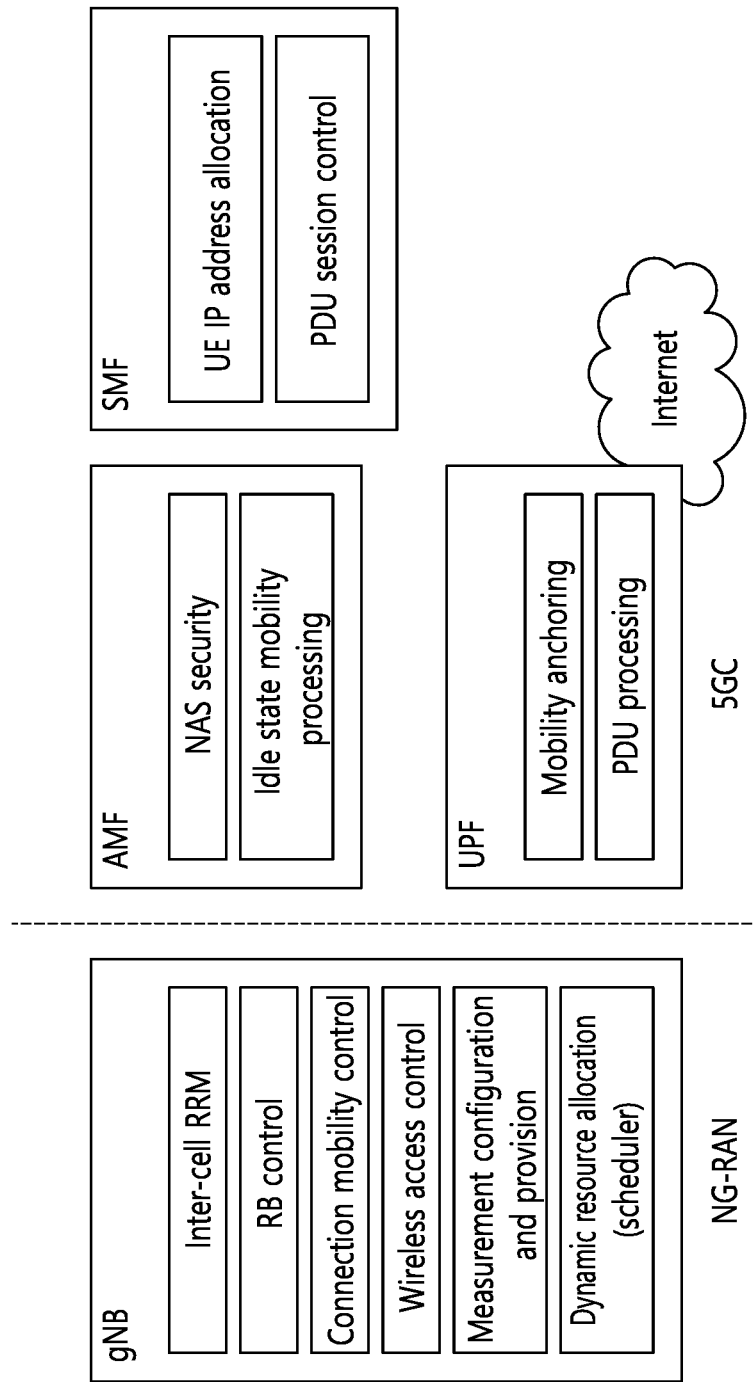
FIG. 5 illustrates a functional division between the NG-RAN and the SGC.

FIG. 5 illustrates a functional division between the NG-RAN and the 5GC.

Referring to FIG. 5, the gNB may provide functions such as inter-cell radio resource management (RRM), radio bearer (RB) management, connection mobility control, radio admission control, measurement configuration & provision, and dynamic resource allocation. The AMF may provide such functions as NAS security and idle state mobility processing. The UPF may provide such functions as mobility anchoring and PDU processing. The Session Management Function (SMF) may provide functions such as allocation of UE IP address and PDU session control.

The present invention is related to V2X communication and more particularly, to a method for sidelink retransmission. The present invention is described with respect to the V2X communication of the NR but may also be applied to other scenarios including V2V or device-to-device (D2D) communication.

Figure 6:
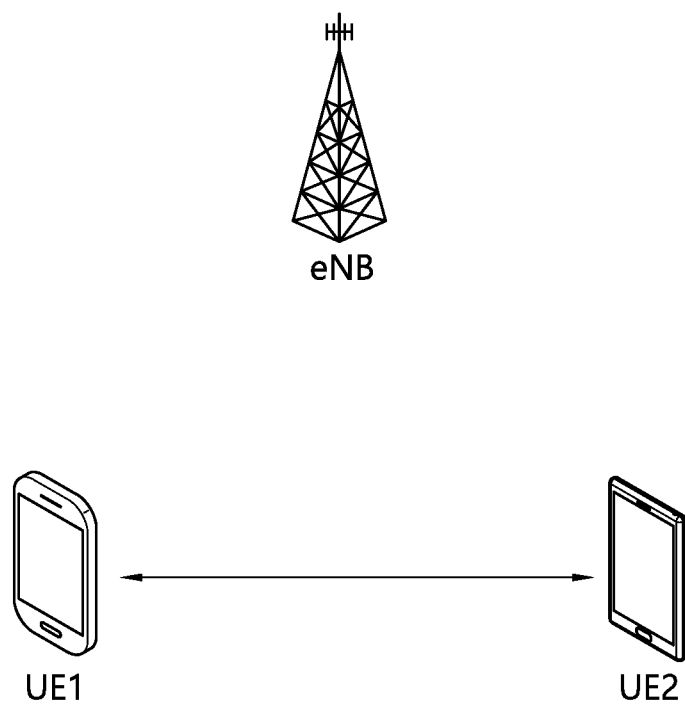
FIG. 6 illustrates UEs performing V2X or D2D communication.

FIG. 6 illustrates UEs performing V2X or D2D communication.

Referring to FIG. 6, in the V2X/D2D communication, the term UE primarily refers to a user terminal. However, when a network device such as an eNB transmits and receives a signal according to a communication scheme employed for UEs, the eNB may also be regarded as a kind of terminal.

UE 1 may operate to select a resource unit corresponding to a specific resource within a resource pool which is a set of series of resources and to transmit a D2D signal by using the corresponding resource unit. UE 2, which is a UE receiving the D2D signal, may be configured for a resource pool to which the UE 1 may transmit a signal and detect the signal transmitted from the UE 1 within the corresponding resource pool.

At this time, if the UE 1 is within coverage of an eNB, the eNB may inform the UE 1 of the resource pool. On the other hand, if the UE 1 lies outside the coverage of the eNB, other UE may inform the UE 1 of the resource pool, or a predetermined resource may be utilized.

In general, a resource pool consists of a plurality of resource units, and each UE may select one or more resource units to transmit its D2D signal.

Figure 7:
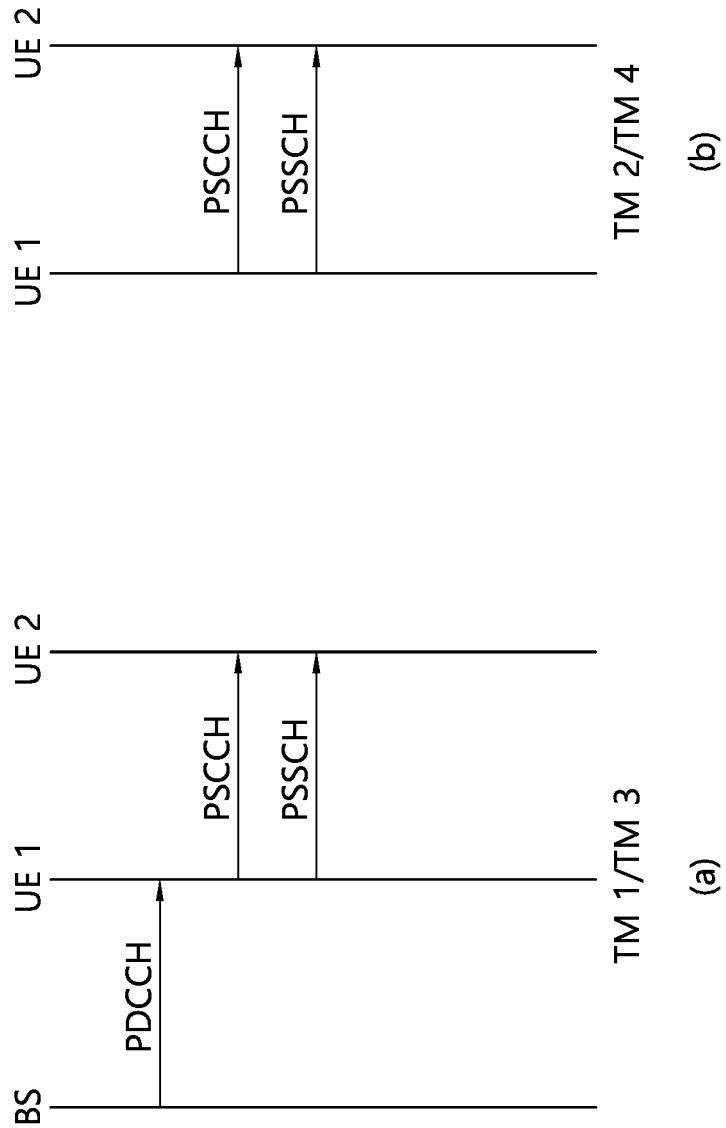
FIG. 7 illustrates a UE operation according to the transmission mode (TM) related to V2X/D2D communication.

FIG. 7 illustrates a UE operation according to the transmission mode (TM) related to V2X/D2D communication.

FIG. 7(a) is related to transmission mode 1, 3 while FIG. 7(b) is related to transmission mode 2, 4. In the transmission mode 1, 3, an eNB performs resource scheduling for UE 1 through PDCCH (more specifically, DCI), and the UE 1 performs D2D/V2X communication with UE 2 according to the corresponding resource scheduling. After transmitting Sidelink Control Information (SCI) to the UE 2 through a Physical Sidelink Control Channel (PSCCH), the UE 1 may transmit data based on the SCI through a Physical Sidelink Shared Channel (PSSCH). The transmission mode 1 may be applied to D2D communication while the transmission mode 3 may be applied to V2X communication.

The transmission mode 2, 4 may be referred to as a mode in which a UE performs scheduling autonomously. More specifically, the transmission mode 2 may be applied to D2D communication, and a UE may select a resource by itself within a set resource pool to perform a D2D operation. The transmission mode 4 may be applied to V2X communication, and a UE may select a resource by itself within a selection window through a process such as sensing/SA decoding, after which the UE may perform a V2X operation. After transmitting SCI to the UE 2 through the PSCCH, the UE 1 may transmit data based on the SCI through the PSSCH. In what follows, the transmission mode may be referred to as a mode.

While the control information transmitted by an eNB to a UE through the PDCCH is called downlink control information (DCI), the control information transmitted by a UE to other UEs through the PSCCH may be called SCI. The SCI may be expressed in various formats, for example, SCI format 0 and SCI format 1.

The SCI format 0 may be used for scheduling of the PSSCH. The SCI format 0 may include a frequency hopping flag (1 bit), resource block allocation and hopping resource allocation field (the number of bits of which may differ depending on the number of resource blocks of a sidelink), time resource pattern (7 bit), modulation and coding scheme (MCS) (5 bit), time advance indication (11 bit), and group destination ID (8 bit).

The SCI format 1 may be used for scheduling of the PSSCH. The SCI format 1 may include priority (3 bit), resource reservation (4 bit), frequency resource position of initial transmission and retransmission (the number of bits of which may differ depending on the number of sub-channels of a sidelink), time gap between initial transmission and retransmission (4 bit), MCS (5 bit), retransmission index (1 bit), and reserved information bit. In what follows, the reserved information bit may be called a reserved bit for short. Reserved bits may be added until the bit size of the SCI format 1 becomes 32 bit. In other words, the SCI format 1 includes a plurality of fields, each of which has different information from each other, where the number of remaining bits excluding the total number of bits of the plurality of fields from the total number of fixed bits (32 bit) of the SCI format 1 may be called reserved bits.

The SCI format 0 may be used for the transmission mode 1, 2 while the SCI format 1 may be used for the transmission mode 3, 4.

Figure 8:
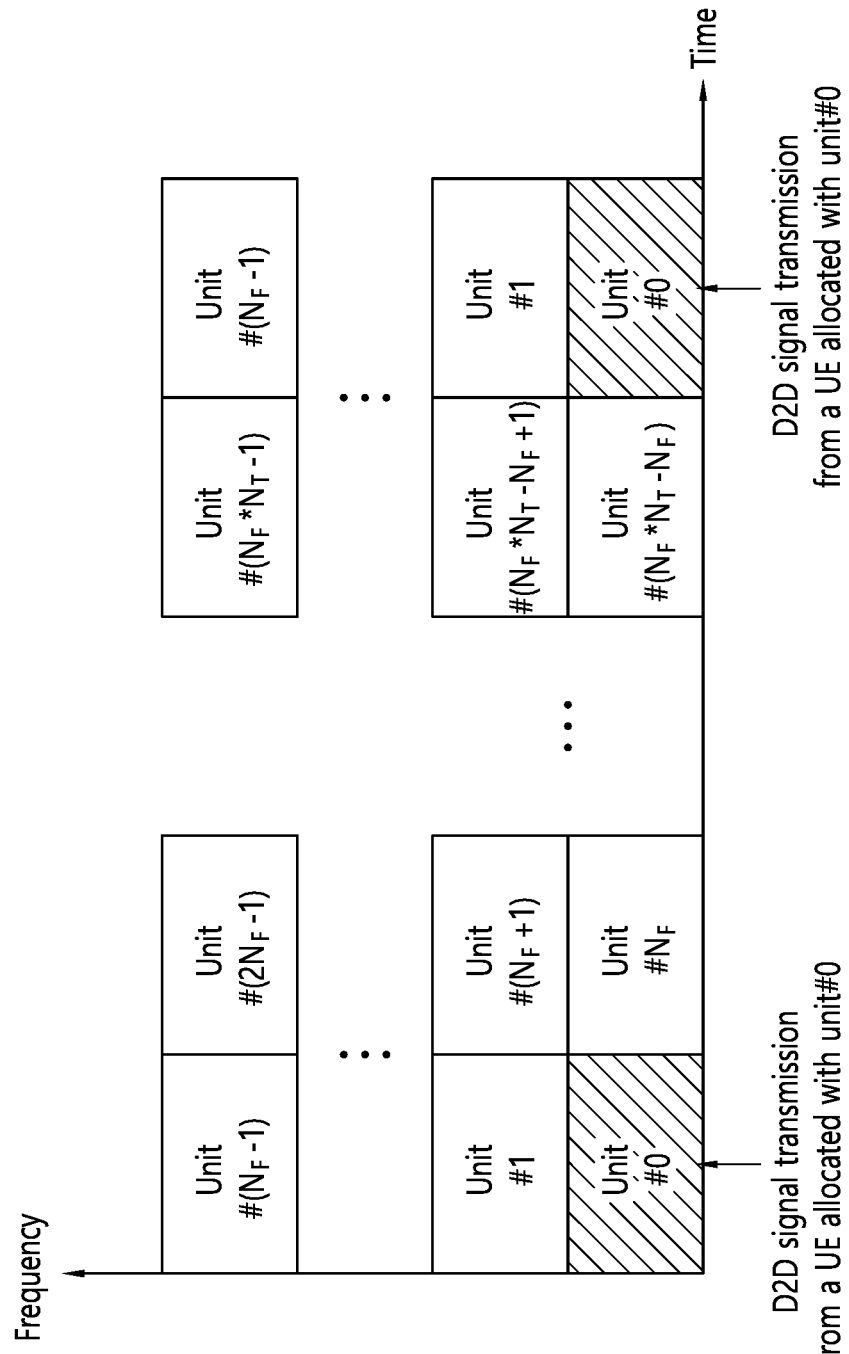
FIG. 8 illustrates an example of a configuration of resource units.

FIG. 8 illustrates an example of a configuration of resource units.

Referring to FIG. 8, the entire frequency resources of a resource pool may be divided into $N_F$ units, and the entire time resources of the resource pool may be divided into $N_T$ units, by which a total of $N_F \times N_T$ resource units may be defined within the resource pool.

At this time, it is assumed that the corresponding resource pool is repeated with a period of $N_T$ subframes.

As shown in FIG. 8, one resource unit (for example, Unit #0) may appear repeatedly at regular intervals. Similarly, to obtain a diversity effect in the time or frequency dimension, the index of a physical resource unit to which one logical resource unit is mapped may vary according to a predetermined pattern as time elapses. In the aforementioned resource unit structure, a resource pool may indicate a set of resource units available for transmission, which may be used by a UE attempting to transmit a D2D signal.

A resource pool may be subdivided into various types. For example, the resource pool may be classified according to the content of a D2D signal transmitted from each resource pool. Each resource pool may be classified as follows, where each resource pool may transmit a D2D signal of which the content is described below.

1) Scheduling Assignment (SA) resource pool or D2D (sidelink) control channel: A resource pool by which each transmitting UE transmits a signal including information about the resource position of a D2D data channel transmitted from a succeeding or the same subframe and information required for demodulation of the other data channels (for example, information about modulation and coding scheme (MCS), MIMO transmission scheme, and timing advance).

The signal described in 1) may be transmitted together with D2D data after being multiplexed on the same resource unit. In this case, an SA resource pool may indicate a resource pool to which SA is transmitted by being multiplexed with D2D data. The SA resource pool may also be called a D2D (sidelink) control channel.

2) D2D data channel: A resource pool by which a transmitting UE transmits user data by using a resource designated through SA. If it is possible that D2D data and SA information are multiplexed and transmitted together on the same resource unit, a resource pool for a D2D data channel may transmit only the D2D data channel in such a way to exclude the SA information. In other words, the D2D data channel resource pool still uses the resource element which has been used for transmitting SA information on the basis of individual resource units within the SA resource pool.

3) Discovery channel: A resource pool for messages by which a transmitting UE transmits information such as its identity (ID) so that a neighboring UE may discover the transmitting UE.

Even if a D2D signal carries the same content as described above, a different resource pool may be utilized depending on the transmission and reception attributes of the D2D signal. As one example, even if the same D2D data channel or the same discovery message is transmitted, the resource pool may be further classified into another different resource pool depending on a scheme for determining transmission timing of the D2D signal (for example, whether the D2D signal is transmitted at the time of receiving a synchronization reference signal or transmitted after a predetermined timing advance is applied at the time of receiving the synchronization reference signal), resource allocation scheme (for example, whether a transmission resource of an individual signal is allocated by an eNB for each individual transmitting UE or whether an individual transmitting UE selects an individual signal transmission resource by itself within the resource pool), signal format (for example, the number of symbols occupied by each D2D signal in one subframe or the number of subframes used for transmission of one D2D signal), strength of a signal from the eNB, or transmission power intensity of a D2D UE).

As described above, the method in D2D communication for indicating a transmission resource of a D2D transmitting UE directly by the eNB may be called a mode 1 while the method for selecting a transmission resource directly by the UE, where a transmission resource region is predetermined or the eNB designates the transmission resource region, may be called a mode 2.

In the case of D2D discovery, the case where the eNB directly indicates a resource may be referred to as type 2 while the case where the UE directly selects a transmission resource from a predetermined resource region or a resource region indicated by the eNB may be referred to as type 1.

Meanwhile, the D2D may also be called sidelink. The SA may also be called a physical sidelink control channel (PSCCH), and D2D synchronization signal may also be called a sidelink synchronization signal (SSS). A control channel which transmits the most basic information before initiation of D2D communication is referred to as a physical sidelink broadcast channel (PSBCH), where the PSBCH may be transmitted together with an SSS and may alternatively called a physical D2D synchronization channel (PD2DSCH). A signal notifying that a specific UE is located in the vicinity may include an ID of the specific UE, and a channel to which such a signal is transmitted may be called a physical sidelink discovery channel (PSDCH).

In the D2D communication, only the D2D communication UE transmits a PSBCH together with an SSS, and in this reason, measurement of an SSS has been performed by using a demodulation reference signal (DM-RS) of the PSBCH. A UE in the out-coverage area may measure the DM-RS of the PSBCH and measure reference signal received power (RSRP) of the signal to determine whether the UE itself operate as a synchronization source.

Hereinafter, the sidelink RSSI (Sidelink Received Signal Strength Indicator; S-RSSI), PSSCH Reference Signal Received Power (PSSCH-RSRP), Channel Busy Rate (CHANNEL BUSY RATIO; CBR), Channel Occupancy Rate (CHANNEL OCCUPANCY RATIO (CR) will be described.

S-RSSI

Sidelink RSSI (S-RSSI) may be defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe.

Herein, the reference point for the S-RSSI may be the antenna connector of the UE.

If receiver diversity is in use by the UE, the reported value may not be lower than the corresponding S-RSSI of any of the individual diversity branches.

S-RSSI is applicable for RRC_IDLE intra-frequency, RRC_IDLE inter-frequency, RRC_CONNECTED intra-frequency, and/or RRC_CONNECTED inter-frequency.

PSSCH-RSRP

PSSCH Reference Signal Received Power (PSSCH-RSRP) may be defined as the linear average over the power contributions (in [W]) of the resource elements that carry demodulation reference signals associated with PSSCH, within the PRBs indicated by the associated PSCCH.

Herein, the reference point for the PSSCH-RSRP may be the antenna connector of the UE.

If receiver diversity is in use by the UE, the reported value may not be lower than the corresponding PSSCH-RSRP of any of the individual diversity branches.

PSSCH-RSRP is applicable for RRC_IDLE intra-frequency, RRC_IDLE inter-frequency, RRC_CONNECTED intra-frequency, and/or RRC_CONNECTED inter-frequency.

Herein, the power per resource element may be determined from the energy received during the useful part of the symbol, excluding the CP.

CBR

Channel busy ratio (CBR) measured in subframe n is defined as follows.

For PSSCH, CBR may be the portion of sub-channels in the resource pool whose S-RSSI measured by the UE exceed a (pre-)configured threshold sensed over subframes [n−100, n−1].

For PSCCH, in a pool (pre)configured such that PSCCH may be transmitted with its corresponding PSSCH in non-adjacent resource blocks, CBR may be the portion of the resources of the PSCCH pool whose S-RSSI measured by the UE exceed a (pre-)configured threshold sensed over subframes [n−100, n−1], assuming that the PSCCH pool is composed of resources with a size of two consecutive PRB pairs in the frequency domain.

CBR is applicable for RRC_IDLE intra-frequency, RRC_IDLE inter-frequency, RRC_CONNECTED intra-frequency, and/or RRC_CONNECTED inter-frequency.

Herein, the subframe index may be based on physical subframe index.

CR

Channel occupancy ratio (CR) evaluated at subframe n may be defined as follows.

CR may be the total number of sub-channels used for its transmissions in subframes [n−a, n−1] and granted in subframes [n, n+b] divided by the total number of configured sub-channels in the transmission pool over [n−a, n+b].

CR is applicable for RRC_IDLE intra-frequency, RRC_IDLE inter-frequency, RRC_CONNECTED intra-frequency, and/or RRC_CONNECTED inter-frequency.

Herein, a may be a positive integer and b may be 0 or a positive integer. a and b may be determined by UE implementation with a+b+1=1000, a>=500, and n+b should not exceed the last transmission opportunity of the grant for the current transmission.

Herein, CR may be evaluated for each (re)transmission.

Herein, in evaluating CR, the UE may assume the transmission parameter used at subframe n is reused according to the existing grant(s) in subframes [n+1, n+b] without packet dropping.

Herein, the subframe index may be based on physical subframe index.

Herein, CR can be computed per priority level.

Hereinafter, this invention is described in detail.

Whether or not to introduce transmission diversity in V2X communication is being discussed. For example, whether or not transmission diversity is allowed in the resource pool for a specific V2X resource pool may be determined (and/or signaled) by the network, and if transmission diversity is allowed, each terminal may determine whether V2X communication based on transmission diversity is to be performed.

Here, in order to guarantee the performance of decoding of a terminal (e.g., a legacy terminal, etc.) that does not perform transmission diversity based V2X communication in a V2X resource pool in which a terminal performing transmission diversity based V2X communication coexists with another terminal not performing transmission diversity based V2X communication, the transmission diversity scheme may be configured to be applicable only to the PSSCH transmission. That is, the transmission diversity scheme may not be applied to the PSCCH, and a specific transmission diversity scheme, in which the existing form has been used (and/or which has been set (/signaled) in advance for PSCCH), may be used for the PSCCH (e.g., only cyclic delay diversity (CDD) is used).

Accordingly, in order to prevent resource collision between a terminal to perform V2X communication based on transmission diversity and a terminal (e.g., a legacy terminal) not to perform V2X communication based on transmission diversity, additional information or operations such as sensing of the terminal, PSSCH Reference Signal Received Power (PSSCH-RSRP) measurement, and power boosting may be required.

Accordingly, the present invention provides a method of measuring signal receiving power of a terminal and a terminal using the method according to the introduction of transmission diversity in V2X communication.

For example, the following proposed schemes present a method of efficiently sensing MAP_UE by SAP_UE (and/or a method of efficiently recognizing whether another terminal performs TXD-based channel (e.g., PSSCH) transmission) in the case that a terminal (MAP_UE) performing V2X message transmission operation based on TX diversity (TXD) coexist with a terminal (SAP_UE) not performing V2X message transmission operation based on TXD (e.g., a terminal performing transmission operation based on single antenna port (AP) and/or based on relatively less number of APs compared to MAP_UE). Here, for example, in the present invention, the "TXD" wording may also be interpreted as "transmission operation based on a plurality of antenna ports (AP) set (/signaled) in advance" (for example, space frequency block coding (SFBC), space time block coding (STBC), precoding cycling (/random beamforming) for each antenna port (AP) (/symbol), etc.). Here, for example, when a plurality of AP-based TXD operations are performed, power division between different APs may be performed (A) (always) evenly, and/or (B) according to a preset (/signaled) power split ratio (between APs). Here, as an example, in the present invention, "SAP_UE" wording may be interpreted as an existing legacy terminal (REL-14) that performs a single AP based transmission operation and/or a sensing operation. Here, for example, in the present invention, the "sensing operation" wording may also be interpreted as operation of measuring PSSCH reference signal based on physical sidelink shared channel (PSSCH) demodulation reference signal (DM-RS) sequence (which is scheduled by physical sidelink control channel (PSCCH) that has succeeded in decoding), and/or sidelink received signal strength indicator (S-RSSI) (based on sub-channel related with V2X resource pool), etc.

Here, for example, the following (some) proposed schemes may be limitedly applied to (A) when previously set (/signaled) number of APs (e.g., "1") and/or AP index (/number) (e.g., AP index (/number) used by SAP_UE) is shared between SAP_UE and MAP_UE; and/or (B) when MAP_UE (re)uses the mapping (/generation) rule for reference signal (RS) (e.g., DM-RS) sequence (/orthogonal cover code (OCC)) of SAP_UE (exiting (REL-14)) (on the AP index (/number) shared with at least SAP_UE) (for PSSCH-RSRP (and/or S-RSSI) measurement operation of SAP_UE (for MAP_UE)); and/or (C) when MAP_UE additionally performs RS in the form of code division multiplexing (CDM) on (remaining) AP index (/number) (with RS on AP index (/number) shared with SAP_UE) which is not shared with SAP_UE (e.g., a plurality of AP-related DM-RSs are transmitted in the form of CDM on the same (physical) symbol (/resource)).

Here, as an example, in particular, (RS) overhead can be reduced, compared to mapping different AP related RSs on (some or all) different symbols (/resources).

Here, for example, in order to prevent (sensing-based) resource collision between a terminal performing transmission diversity based V2X communication and a terminal (e.g., a legacy terminal, etc.) not performing transmission diversity based V2X communication, at least on the antenna ports shared between them, the terminal performing transmission diversity based V2X communication should generate a DMRS sequence using the same principle/method as that of the terminal (e.g., a legacy terminal, etc.) not performing transmission diversity based V2X communication. That is, in this way, the terminal (e.g., a legacy terminal, etc.) not performing transmission diversity based V2X communication can RSRP measurement (based on the sequence) on at least the corresponding antenna port. Otherwise, the terminal (e.g., a legacy terminal, etc.) not performing transmission diversity based V2X communication cannot efficiently exclude (based on sensing) the resource selected by the terminal performing transmission diversity based V2X communication.

Figure 9:
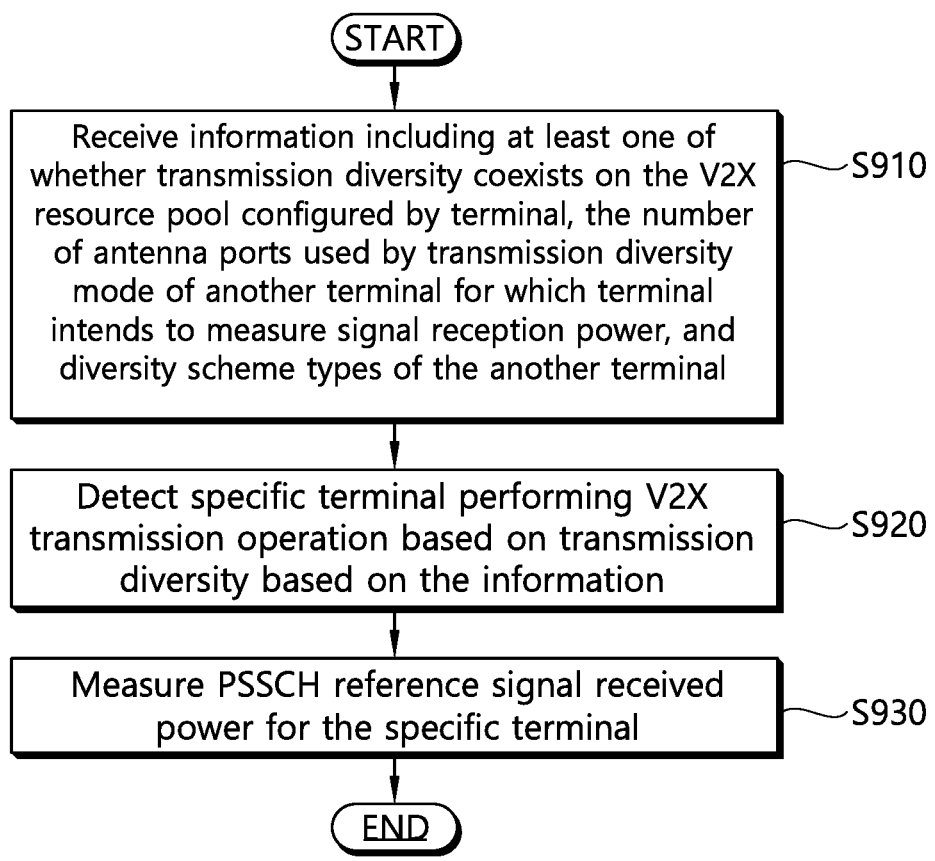
FIG. 9 is a flowchart of a method of measuring signal reception power according to an embodiment of the present invention.

FIG. 9 is a flowchart of a method of measuring signal reception power according to an embodiment of the present invention.

According to FIG. 9, it is possible to receive information including at least one of whether or not transmission diversity coexists on the V2X resource pool configured by the terminal, the number of antenna ports used by the transmission diversity mode of another terminal for which the terminal intends to measure signal reception power, and the diversity scheme types of the another terminal (S910).

In other words, when a terminal performing V2X message transmission operation based on transmission diversity on a V2X resource pool and a terminal performing V2X message transmission operation without using transmission diversity coexist, it may be set to (additionally) include at least one of whether or not transmission diversity coexists on the V2X resource pool configured by the terminal, the number of antenna ports used by the transmission diversity mode of another terminal for which the terminal intends to measure signal reception power, and the diversity scheme types of the another terminal.

Subsequently, a specific terminal performing a V2X transmission operation based on transmission diversity may be sensed or detected based on the information (S920).

Thereafter, the PSSCH reference signal received power (PSSCH-RSRP) for the specific terminal may be measured (S930).

Here, the at least one information may be included in V2X resource pool setting information or a field defined in the PSCCH.

Also, in consideration of compatibility with a legacy terminal, the terminal performing V2X communication without using the transmission diversity may receive the information using reserved bits of the PSCCH from the terminal performing the V2X message transmission operation based on the transmit diversity.

Also, the terminal and the specific terminal may exist on the same V2X resource pool.

In addition, the terminal may increase the PSSCH RSRP value measured at the antenna port used for V2X transmission of the terminal by a preset offset.

In this case, the terminal may measure the PSSCH RSRP on each of a plurality of antenna ports used by the specific terminal, and determine the final PSSCH RSRP by combining the measured values.

In addition, the specific terminal may have a Prose Per Packet Priority (PPPP) (and/or PSSCH-RSRP linked to the corresponding PPPP) within a preset range.

In this case, the specific terminal may have a channel busy ratio (CBR) lower than a preset threshold.

In addition, the V2X resource pool may be set independently (or separately) from the V2X resource pool in which transmission diversity based V2X communication is not allowed.

In addition, transmission diversity may be applicable only to PSSCH transmission on the V2X resource pool. By doing so, it is possible to increase the accessibility of the legacy terminal to the PSCCH using the existing format for the PSCCH, and to ensure the sensing performance and/or decoding performance of the legacy terminal.

In addition, the specific terminal may be a terminal within a preset speed range.

In this case, the terminal measures the PSSCH-RSRP based on a demodulation reference signal (DMRS) sequence generated by the specific terminal, but the demodulation reference signal (DMRS) sequence generated by the specific terminal may be generated in the same manner as the terminal generates the DMRS sequence.

Hereinafter, more details of the embodiment of the above-described V2X communication method of the terminal will be described.

[Proposed method] In one example, SAP_UE (and/or MAP_UE) may be controlled to recognize that MAP_UE exists (/coexists) on the V2X resource pool on which the SAP_UE performs transmission (/sensing) operation (and/or TXD MODE based on a plurality of APs is allowed) according to the following (some) rules or may be controlled to recognize whether another terminal performs TXD-based channel (e.g., PSSCH) transmission.

Here, as an example, TXD scheme may be set (/signaled) to be applicable (limitedly) only to PSSCH (and/or PSCCH) on the corresponding V2X resource pool (SAP_UE and MAP_UE coexist) (to MAP_UE).

(Example #1) As an example, (A) through V2X resource pool setting information and/or (newly) defined fields on the PSCCH (and/or (embedded) information included in the PSSCH), etc. (some) following information may be additionally signaled.

- Information about whether it is TXD MODE (or MAP_UE) (and/or whether TXD MODE is allowed (or whether MAP_UE exists (/coexists) (in the V2X resource pool)
- Information (and/or number (/index) on the number of APs (and/or number (/index)) used by TXD MODE (or MAP_UE) (in which the transmission power is (evenly) divided and allocated) (and/or TXD ORDER information and/or power split ratio information between APs used by TXD MODE (or MAP_UE)
- Information on the type of TXD scheme (used) (e.g. STBC, precoding cycling (/random beamforming),
etc.) (and/or allowed TXD scheme type information (on that V2X resource pool)

Here, as an example, (additionally) TXD-related symbol paring information and/or symbol (group) unit information, which precoding (/beam) (and/or AP) (index) is (cyclically) changed (/mapped) may be signaled.

In addition, as an example, if the terminal (e.g., MAP_UE) performing transmission operation based on TXD MODE (on the same V2X resource pool) by the above-described SAP_UE (Example #1) is detected (/recognized), (the MAP_UE-related) PSSCH-RSRP (and/or S-RSSI) measurement operation may be performed according to the following (some) rules.

Here, as an example, when the following rule is applied, the SAP_UE may efficiently derive (/compensate for) the PSSCH-RSRP (and/or S-RSSI) measurement value related to the MAP_UE, thereby avoiding a (resource selection) collision between each other.

(Example #2) For example, when the number of APs (and/or TXD order) used by TXD MODE (or MAP_UE) is "K", SAP_UE may be controlled to offset the PSSCH-RSRP (and/or S-RRSI) measurement value (related with the MAP_UE) which is measured on (one) AP number (/index) (e.g., AP number shared between SAP_UE and MAP_UE) which is used for the transmission of the SAP_UE itself (e.g., "10*LOG 10(K)" [DB]").

In other words, since a terminal performing V2X communication based on transmit diversity performs a transmission operation using a plurality of antenna ports, transmission power are divided/shared among the plurality of antenna ports. Accordingly, a terminal performing a V2X message transmission operation and a PSSCH-RSRP measurement operation (without using transmission diversity) by using only a part (or one) of the corresponding antenna ports may regard the PSSCH-RSRP measurement value for the UE performing V2X communication based on transmit diversity as a relatively small value. To compensate for this, when a first UE performing V2X communication without using transmission diversity measures PSSCH-RSRP for a second UE performing V2X communication based on transmission diversity, it is possible to increase the value measured on the antenna port the first UE uses by a preset offset.

(Example #3) In one example, SAP_UE may be controlled to respectively perform PSSCH-RSRP (and/or S-RSSI) (independently) on a plurality of AP numbers (/index) (or for different (RS) CS/OCC which is used by (the corresponding) TXD MODE (or MAP_UE).

Here, as an example, a plurality of (AP number (/index) (or (RS) CS/OCC-related) PSSCH-RSRP (and/or S-RSSI) measurement values obtained through the corresponding process may be combined (e.g., sum (/average) (based on (weight for each AP)) according to predefined rules to thereby derive the final measurement value.

In other words, unlike (Example #2), when a terminal performing V2X communication without using transmission diversity measures a PSSCH-RSRP for a terminal performing V2X communication based on transmission diversity, the PSSCH-RSRP measurement values are first combined after measuring PSSCH-RSRP for each antenna port to thereby determine the final measurement value.

In addition, as an example, in case of a terminal (e.g., MAP_UE) performing a TXD MODE based transmission operation, (some or all) sensing/transmission parameters below may be differently set (/signaled) (compared to SAP_UE). Here, as an example, when the following (partial) rule is applied, the influence, which the existing (REL-14) terminal on (particularly) the same V2X resource pool receives from a terminal (e.g., MAP_UE) performing a TXD MODE based transmission operation, (e.g., resource candidate excluding operation based on PSSCH-RSRP measurement) may be reduced (as much as possible).

- (V2X message-related) PPPP value (/range) (e.g., transmission of SAP_UE (or MAP_UE) may be relatively protected by allowing MAP_UE to select relatively low (or high) PPPP value (/range) compared to SAP_UE. Here, as an example, a transmission based on a low (or high) PPPP value (/range) means that when another terminal determines whether it is possible to select resources used as the corresponding transmission (or idle/busy), relatively low (or high) PSCCH-RSRP threshold value is determined.) (transmission of SAP_UE (or MAP_UE) may be relatively protected by setting (/signaling) relatively low (or high) PSSCH-RSRP threshold to MAP_UE compared to SAP_UE even if it is PSSCH-RSRP threshold linked to PPPP value (/range).))
- sensing operation performing section (/cycle) and/or section in which candidate (transmission) resource can be selected (selection window) and/or range of selecting random value in order to determine maintenance section of (re)selected (/reserved) resource (and/or coefficient multiplied with the selected random value (in order to derive C_RESEL value)) and/or resource reservation cycle and/or candidate (transmission) resource ratio (/number) that should remain as the minimum after PSSCH-RSRP threshold based candidate (transmission) resource excluding operation (and/or offset value added to (related) PSSCH-RSRP threshold when the remaining candidate (transmission) resource ratio (/number) is smaller than the preset (/signaled) threshold) and/or candidate (transmission) resource ratio (/number) which should remain as the minimum after S-RRSI based candidate (transmission) resource excluding operation
- The CBR threshold and/or the CR_LIMIT value (for each PPPP/CBR) used in the (sub) channel busy (/idle) determination.

Further, for example, the transmission operation based on TXD MODE (based on a plurality of APs) may be set (/signaled) to be limitedly allowed only (A) when transmission of PPPP value (/range) higher than preset (/signaled) threshold (/range) is performed and/or (B) when CBR value lower than preset (/signaled) threshold (/range) is measured.

Here, as an example, the reason for the application of the rule is that the TXD MODE scheme application takes more space from the viewpoint of the receiving terminal, so the probability of successful reception on the collision resource (from the system perspective) may become further lowered.

Further, for example, the transmission operation based on TXD MODE (based on a plurality of APs) may be set (/signaled) to be limitedly allowed only (A) when transmission of PPPP value (/range) lower than preset (/signaled) threshold (/range) is performed and/or (B) when CBR value higher than preset (/signaled) threshold (/range) is measured and/or (C) when the sub-channels of the number less (or more) than the preset (/signaled) threshold (/range) are available for transmission).

In other words, in order to minimize the impact (e.g., selective resource collision, interference) on the existing terminal on the same V2X resource pool, the terminal that wants to perform V2X transmission operation based on transmission diversity may be controlled to (actually) perform V2X communication based on transmission diversity only under certain conditions. That is, the terminal to perform the transmission diversity based V2X transmission operation may (actually) perform V2X communication based on transmission diversity only when trying to transmit a message having a PPPP value lower than a preset threshold or when the CBR value lower than the preset threshold is measured.

Further, for example, V2X resource pool (e.g., V2X resource pool having MAP_UE) allowing TXD MODE (based on a plurality of APs) may be set (signaled) independently (or differently) from V2X resource pool (e.g., V2X resource pool having SAP_UE) allowing transmission operation based on non-TXD MODE (or single AP).

Herein, for example, TXD scheme may be set (/signaled) to be applied not only (exceptionally) to PSSCH transmission but also to (linked) PSCCH transmission on the (separately set (/signaled) V2X resource pool allowing TXD mode.

K (e.g., "K≥1") APs, used for TXD mode, (except for APs shared between SAP_UE and MAP_UE may be set to be randomly selected among a plurality of preset (/signaled) (M) AP number (/index) candidates (e.g., "M≥K").

Further, for example, a terminal (MAP_UE) performing transmission operation based on TXD mode may be controlled to allow (one) AP number used by SAP_UE (RS cyclic shift (CS) (and/or sequence group hopping) related with PSSCH transmission on AP number (/index) shared between SAP_UE and MAP_UE) (and/or scrambling) to be generated (/performed) by a function having linked PSCCH CRC value, etc. as an input parameter (SH_PARA), and PSSCH transmission related RS CS (and/or sequence group hopping on the (non-shared) (remaining) AP (and/or scrambling) to be generated (/performed by a function having a result value, which is generated by (additionally) applying preset (/signaled) (antenna port-specific) offset value to SH_PARA in advance, as an input parameter.

For example, in the present invention, (A) TXD operation may be set (/signaled) to be limitedly applied (/allowed) only at a speed less than a preset threshold (and/or (specific) speed range) (e.g., at high speed, time domain diversity is generate, so space diversity has less meaning, and since channel quickly changes, the operation of TXD such as STBC becomes difficult) (and/or when (time/frequency) sync source type (e.g., frequency (error) offset is relatively small) and only CBS measurement value less than preset (/signaled) threshold), and/or (B) preset (/signaled) speed (range) (and/or for each (time/frequency) sync source type and/or preset (/signaled) CBR measurement value (range) (related with TXD)) (paired) symbol (group) unit (length) may be differently (or independently) set (/signaled).

Here, in one example, the information may be set (/signaled) "pool-specifically" (and/or "carrier-specifically").

It is obvious that examples of the proposed scheme described above may also be regarded as kind of proposed schemes, since they may be included as one of the implementation methods of the present invention. In addition, although the above-described proposal schemes may be independently implemented, some proposal schemes may be implemented in combination (or merged).

For example, the proposed methods of the present invention have been explained based on the 3GPP LTE system for convenience of description, but the scope of the system to which the proposed methods are applied can be extended to other systems in addition to the 3GPP LTE system.

As an example, the proposed methods of the present invention can be extended and applied for D2D communication. Here, as an example, D2D communication means that a terminal communicates directly with another terminal using a wireless channel. Herein, for example, the terminal means a user's terminal, but when a network equipment such as a base station transmits/receives signals according to a communication method between terminals, it may also be regarded as a kind of terminal.

Also, as an example, the proposed schemes of the present invention may be limitedly applied only to the MODE 3 V2X operation (and/or the MODE 4 V2X operation). In addition, as an example, the proposed schemes of the present invention may be limitedly applied only when transmitting a V2X message based on a specific TXD scheme (e.g., STBC or precoding (/beam) cycling).

In addition, as an example, the proposed schemes of the present invention may be limitedly applied only to preset (/signaled) (specific) V2X channel (/signal) transmission (e.g., PSSCH (and/or (linked) PSCCH and/or PSBCH)).

Further, as an example, the proposed schemes of the present invention may be limitedly applied only to the case that PSSCH and (linked) PSCCH are adjacently (and/or non-adjacently) transmitted (or and/or when a transmission based on a preset (/signaled) modulation coding scheme (MSC) (and/or coding rate and/or RB) (value (/range) is performed).

Figure 10:
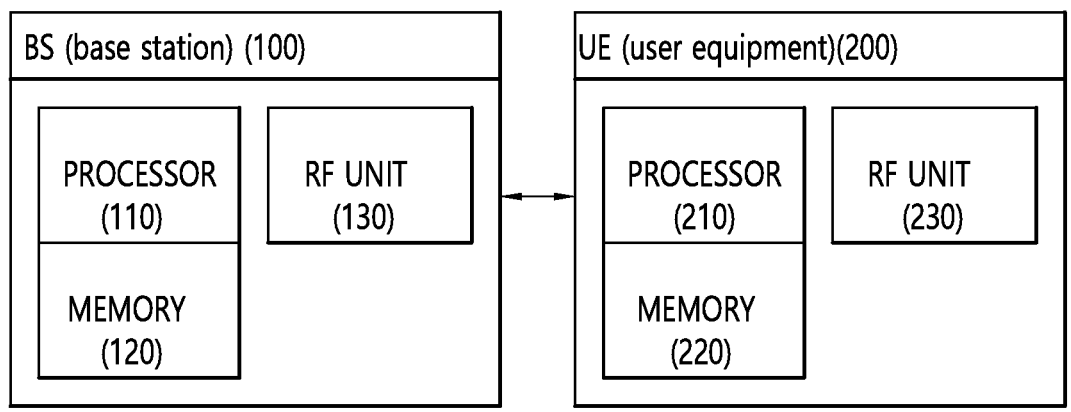
FIG. 10 is a block diagram illustrating a communication device in which an embodiment of the present invention is implemented.

FIG. 10 is a block diagram illustrating a communication device in which an embodiment of the present invention is implemented.

Referring to FIG. 10, a base station 100 includes a processor 110, a memory 120, and a transceiver 130. The illustrated processor, memory, and transceiver may be implemented as separate chips, or at least two blocks/functions may be implemented through one chip.

The processor 110 implements the proposed functions, processes and/or methods. The memory 120 is connected to the processor 110 and stores various information for driving the processor 110. The transceiver 130 is connected to the processor 110 to transmit and/or receive a radio signal.

A user equipment (UE) (200) includes a processor (210), a memory (220), and a transceiver (230). The processor (210) implements proposed functions, processes and/or methods. The memory (220) is connected to the processor (210) and stores various information for driving the processor (210). The transceiver (230) is connected to the processor (210) and transmits and/or receives radio signals. The UE (200) may transmit/retransmit a V2X signal to another UE according to the above-described method.

The processor (110, 210) may include an application-specific integrated circuit (ASIC), a separate chipset, a logic circuit, a data processing unit, and/or a converter inter-converting baseband signals and radio signals. The memory (120, 220) may include a read-only memory (ROM), a random access memory (RAM), a flash memory, a memory card, a storage medium, and/or other equivalent storage devices. The transceiver (130, 230) may include one or more antennas transmitting and/or receiving radio signals. When the embodiment is implemented as software, the above-described methods may be implemented as a module (i.e., process, function, etc.) for performing the above-described functions. The module may be stored in the memory (120, 220) and may be performed by the processor (110, 210). The memory (120, 220) may be located inside or outside the processor (110, 210) and may be coupled to the processor (110, 210) by using various well-known means.

Figure 11:
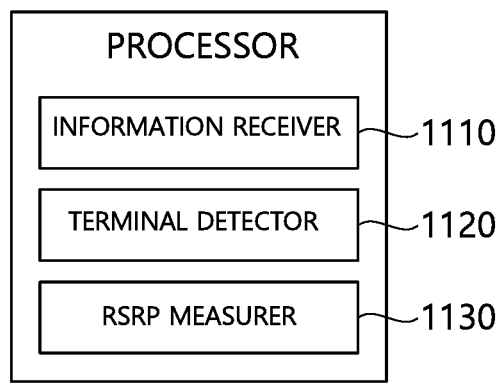
FIG. 11 is a block diagram illustrating an example of devices included in a processor.

FIG. 11 is a block diagram illustrating an example of devices included in a processor.

According to FIG. 11, the processor may include an information receiver 1110, a terminal detector 1120, and an RSRP measurer 1130 in functional terms.

Here, the information receiver may have a function of receiving at least one of whether or not transmission diversity coexists on the V2X resource pool configured by the terminal, the number of antenna ports used by the transmission diversity mode of another terminal for which the terminal intends to measure signal reception power, and the diversity scheme types of the another terminal. In addition, the terminal detector may have a function of detecting a specific terminal performing a V2X transmission operation based on transmission diversity based on the information. In addition, the RSRP measurement unit may have a function of measuring the PSSCH-RSRP for the specific terminal.

The description of the devices included in the above-described processor is only one example, and the processor may further include other functional elements or devices. In addition, specific examples of operations performed by each of the functional devices described above are as described above, and thus redundant description thereof will be omitted.

What is claimed is:

1. A method for measuring signal reception power of a terminal in a wireless communication system, the method comprising:
   receiving information on at least one of whether a transmission diversity mode coexists on a vehicle to everything (V2X) resource pool which is set by the terminal, the number of antenna ports used by the transmission diversity mode of another terminal for which the terminal intends to measure the signal reception power, and a transmission diversity scheme type of the another terminal;
   detecting a specific terminal performing a transmission diversity-based V2X transmission operation based on the information; and
   measuring a physical sidelink shared channel reference signal received power (PSSCH RSRP) for the specific terminal.

2. The method of claim 1, wherein the information is included in a V2X resource pool setting information or a field defined in a physical sidelink control channel (PSCCH).

3. The method of claim 1, wherein the information is received by using reserved bits on a PSCCH.

4. The method of claim 1, wherein the terminal and the specific terminal exist in the same V2X resource pool.

5. The method of claim 1, wherein the terminal increases a PSSCH RSRP value measured on an antenna port used for V2X transmission of the terminal by a preset offset.

6. The method of claim 1, wherein the terminal measures a PSSCH RSRP on a plurality of antenna ports used by the specific terminal, respectively, and a final PSSCH RSRP is determined by combining the measured values.

7. The method of claim 1, wherein the specific terminal has a prose per packet priority (PPPP) within a preset range.

8. The method of claim 1, wherein the specific terminal has a channel busy ratio (CBR) smaller than a preset threshold.

9. The method of claim 1, wherein the V2X resource pool is independently set from a V2X resource pool which does not allow V2X communication based on transmission diversity.

10. The method of claim 1, wherein in the V2X resource pool, transmission diversity is applicable only to PSSCH transmission.

11. The method of claim 1, wherein the specific terminal is a terminal within a preset speed range.

12. The method of claim 1, wherein the terminal measures a PSSCH-RSRP based on a demodulation reference signal (DMRS) generated by the specific terminal, and wherein a demodulation reference signal (DMRS) sequence generated by the specific terminal is generated in a same manner as that of generating a DRMS sequence by the terminal.

13. A terminal comprising:

a transceiver configured to transmit and receive a wireless signal; and a processor configured to be operated in combination with the transceiver, wherein the processor is configured to:

receive information on at least one of whether a transmission diversity mode coexists on a vehicle to everything (V2X) resource pool which is set by the terminal, the number of antenna ports used by the transmission diversity mode of another terminal for which the terminal intends to measure the signal reception power, and a transmission diversity scheme type of the another terminal;

detect a specific terminal performing a transmission diversity-based V2X transmission operation based on the information; and measure a physical sidelink shared channel reference signal received power (PSSCH RSRP) for the specific terminal.

\* \* \* \* \*